(12) United States Patent
Sakai et al.

(10) Patent No.: US 10,593,993 B2
(45) Date of Patent: Mar. 17, 2020

(54) SODIUM ION SECONDARY BATTERY AND POSITIVE ELECTRODE ACTIVE MATERIAL PARTICLES

(71) Applicant: Sumitomo Electric Industries, Ltd., Osaka-shi (JP)

(72) Inventors: Shoichiro Sakai, Osaka (JP); Atsushi Fukunaga, Osaka (JP); Koji Nitta, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 6 days.

(21) Appl. No.: 15/780,670

(22) PCT Filed: Nov. 10, 2016

(86) PCT No.: PCT/JP2016/083412
§ 371 (c)(1),
(2) Date: Jun. 1, 2018

(87) PCT Pub. No.: WO2017/098855
PCT Pub. Date: Jun. 15, 2017

(65) Prior Publication Data
US 2018/0351197 A1  Dec. 6, 2018

(30) Foreign Application Priority Data

Dec. 9, 2015  (JP) ................. 2015-240023

(51) Int. Cl.
*H01M 10/054* (2010.01)
*H01M 4/131* (2010.01)
(Continued)

(52) U.S. Cl.
CPC ........... *H01M 10/054* (2013.01); *H01M 2/04* (2013.01); *H01M 2/26* (2013.01); *H01M 2/30* (2013.01);
(Continued)

(58) Field of Classification Search
CPC .... H01M 10/054; H01M 4/628; H01M 4/366; H01M 4/1391; H01M 4/625; H01M 4/04;
(Continued)

(56) References Cited

U.S. PATENT DOCUMENTS

2015/0295279 A1* 10/2015 Numata ............. H01M 10/399
429/103

FOREIGN PATENT DOCUMENTS

JP  H08-298121 A  11/1996
JP  H09-306502 A  11/1997
(Continued)

OTHER PUBLICATIONS

Highly Stable Na2/3(Mn0.54Ni0.13Co0.13)02 Cathode Modified by Atomic Layer Deposition for Sodium-Ion Batteries, Chem Sus Chem, 2015, vol. 8, pp. 2537-2543 (Year: 2015).*
(Continued)

*Primary Examiner* — Gary D Harris
(74) *Attorney, Agent, or Firm* — Baker Botts L.L.P.; Michael A. Sartori (57) ABSTRACT

An object of the present invention is to reduce the gelation of a positive electrode mixture and to reduce an increase in the resistance of a positive electrode of a sodium ion secondary battery. The invention relates to a sodium ion secondary battery including a positive electrode, a negative electrode, a separator disposed between the positive and negative electrodes, and a sodium-ion-conducting nonaqueous electrolyte. The positive electrode contains positive electrode active material particles, a conductive additive, and a binder. Each positive electrode active material particle includes an oxide particle that absorbs and releases sodium ions and a covering layer covering the oxide particle. The oxide particle contains an oxide A containing Ni and Mn. The covering layer contains at least one material B selected
(Continued)

from the group consisting of a ceramic and a carbonaceous material. The binder contains a fluorocarbon resin.

10 Claims, 3 Drawing Sheets

(51) Int. Cl.
  *H01M 4/36* (2006.01)
  *H01M 4/1391* (2010.01)
  *H01M 4/62* (2006.01)
  *H01M 2/04* (2006.01)
  *H01M 2/26* (2006.01)
  *H01M 2/30* (2006.01)
  *H01M 4/04* (2006.01)
  *H01M 4/66* (2006.01)
  *H01M 4/505* (2010.01)
  *H01M 4/525* (2010.01)
  *H01M 4/02* (2006.01)

(52) U.S. Cl.
  CPC ............ *H01M 4/04* (2013.01); *H01M 4/131* (2013.01); *H01M 4/1391* (2013.01); *H01M 4/366* (2013.01); *H01M 4/623* (2013.01); *H01M 4/625* (2013.01); *H01M 4/628* (2013.01); *H01M 4/661* (2013.01); *H01M 4/505* (2013.01); *H01M 4/525* (2013.01); *H01M 2004/027* (2013.01); *H01M 2004/028* (2013.01)

(58) Field of Classification Search
  CPC ........ H01M 4/623; H01M 4/661; H01M 2/04; H01M 2/26; H01M 2/30; H01M 4/131; H01M 2004/028; H01M 2004/027; H01M 4/525; H01M 4/505
  USPC ......................................................... 429/209
  See application file for complete search history.

(56) References Cited

FOREIGN PATENT DOCUMENTS

| JP | H10-079244 A | 3/1998 |
|---|---|---|
| JP | 2011-236117 A | 11/2011 |
| JP | 2012-134129 A | 7/2012 |
| JP | 2015-082356 A | 4/2015 |
| JP | 2015-153584 A | 8/2015 |
| JP | 2015-170567 A | 9/2015 |

OTHER PUBLICATIONS

Kaliyappan et al., "Highly Stable Na2/3(Mn0.54Ni0.13Co0.13)O2 Cathode Modified by Atomic Layer Deposition for Sodium-Ion Batteries," Chem Sus Chem, 2015, vol. 8, pp. 2537-2543 [Cited in ISR].

Hiroaki Yoshida, et al., "P2-type Na2/3Ni1/3Mn2/3-xTixO2 as a new positive electrode for higher energy Na-Ion batteries," Chem. Comm., 2014, vol. 50, No. 28, p. 3677-3680 [Cited in the Notification of Reasons for Rejection of the corresponding JP Patent Application No. 2015-240023 dated May 21, 2019].

* cited by examiner

SODIUM ION SECONDARY BATTERY AND POSITIVE ELECTRODE ACTIVE MATERIAL PARTICLES

TECHNICAL FIELD

The present invention relates to sodium ion secondary batteries and to positive electrode active material particles.

This application claims priority to Japanese Patent Application No. 2015-240023, filed on Dec. 9, 2015, the entire contents of which are incorporated herein by reference.

BACKGROUND ART

PTLs 1 and 2 propose the addition of an organic or inorganic acid to reduce the gelation of a positive electrode mixture for a positive electrode of a lithium ion secondary battery. In PTL 1, maleic acid, citraconic acid, and malonic acid are used in positive electrode mixtures. In PTL 2, acids such as acetic acid, phosphoric acid, and sulfuric acid are used in positive electrode mixtures.

PTL 3 proposes the use of a polymer containing no structural units derived from vinylidene halides as a binder for an electrode of a sodium ion secondary battery including a sodium-containing transition metal compound as an electrode active material.

CITATION LIST

Patent Literature

PTL 1: Japanese Unexamined Patent Application Publication No. 9-306502
PTL 2: Japanese Unexamined Patent Application Publication No. 10-79244
PTL 3: Japanese Unexamined Patent Application Publication No. 2012-134129

SUMMARY OF INVENTION

A sodium ion secondary battery according to the present invention includes a positive electrode, a negative electrode, a separator disposed between the positive and negative electrodes, and a sodium-ion-conducting nonaqueous electrolyte. The positive electrode contains positive electrode active material particles, a conductive additive, and a binder. Each positive electrode active material particle includes an oxide particle that absorbs and releases sodium ions and a covering layer covering the oxide particle. The oxide particle contains an oxide A containing Ni and Mn. The covering layer contains at least one material B selected from the group consisting of a ceramic and a carbonaceous material. The binder contains a fluorocarbon resin.

Positive electrode active material particles for a sodium ion secondary battery according to the present invention each include an oxide particle that absorbs and releases sodium ions and a covering layer covering the oxide particle. The oxide particle contains an oxide A containing Ni and Mn. The covering layer contains at least one material B selected from the group consisting of a ceramic and a carbonaceous material.

DESCRIPTION OF EMBODIMENTS

Technical Problem

If a halogen-containing resin such as a fluorocarbon resin is used as a binder for a sodium ion secondary battery, gelation may occur significantly noticeably during the preparation of a positive electrode mixture. In view of this, PTL 3 uses a binder containing no structural units derived from vinylidene halides. If a positive electrode mixture gels, the positive electrode mixture cannot be applied to a positive electrode current collector. Even if the positive electrode mixture can be applied, the constituents of the positive electrode mixture may be unevenly dispersed, thus impairing the battery characteristics. In particular, if the positive electrode mixture is applied to a positive electrode current collector on a large scale using a roller, the positive electrode mixture would be difficult to apply because of significantly noticeable gelation.

In PTLs 1 and 2, which relate to lithium ion secondary batteries, acids such as maleic acid and acetic acid are added to reduce the gelation of positive electrode mixtures. However, if such an acid is added to a positive electrode mixture for a sodium ion secondary battery, the resistance of the positive electrode would increase because of the increased amount of acid used, thus decreasing the battery performance. In addition, if the positive electrode active material contains Ni and Mn, it would be difficult to sufficiently reduce gelation even if an acid is added to the positive electrode mixture.

An object of the present invention is to reduce the gelation of a positive electrode mixture and to reduce an increase in the resistance of a positive electrode of a sodium ion secondary battery.

Advantageous Effects of Disclosure

According to the present invention, gelation can be reduced, and an increase in the resistance of a positive electrode of a sodium ion secondary battery can also be reduced.

DESCRIPTION OF EMBODIMENTS OF INVENTION

The features of embodiments of the present invention will be listed and described first.

An embodiment of the present invention relates to a sodium ion secondary battery including a positive electrode, a negative electrode, a separator disposed between the positive and negative electrodes, and a sodium-ion-conducting nonaqueous electrolyte.

The positive electrode contains positive electrode active material particles, a conductive additive, and a binder. Each positive electrode active material particle includes an oxide particle that absorbs and releases sodium ions and a covering layer covering the oxide particle. The oxide particle contains an oxide A containing Ni and Mn. The covering layer contains at least one material B selected from the group consisting of a ceramic and a carbonaceous material. The binder contains a fluorocarbon resin. The oxide particles absorb and release sodium ions and function as a positive electrode active material.

Positive electrode active material particles according to another embodiment of the present invention each include an oxide particle that absorbs and releases sodium ions and a covering layer covering the oxide particle. The oxide particle contains an oxide A containing Ni and Mn. The covering layer contains at least one material B selected from the group consisting of a ceramic and a carbonaceous material.

In general, fluorocarbon resins tend to gel under basic conditions. In particular, fluorocarbon resins containing units such as vinylidene fluoride units and vinyl fluoride units tend to gel by forming a polyene structure as hydrofluoric acid is removed therefrom. Positive electrode active materials that absorb and release sodium ions are highly basic. For example, an aqueous dispersion of 2 parts by mass of the oxide particles containing the oxide A in 100 parts by mass of water has a significantly high pH, namely, 11 or more, or 12 or more in some cases. Thus, if such a highly basic positive electrode active material is used in combination with a binder containing a fluorocarbon resin, the positive electrode mixture would gel noticeably.

If a positive electrode mixture gels, the positive electrode mixture cannot be supported on (specifically, applied onto or charged into) a positive electrode current collector. If positive electrodes are fabricated on a small scale, such as in a laboratory, the positive electrode mixture can be applied to a positive electrode current collector or can be molded into a positive electrode before the positive electrode mixture gels. However, if positive electrodes are fabricated on a large scale, such as using a roller, it would be significantly difficult to stably apply the positive electrode mixture to a positive electrode current collector since the influence of viscosity variations would appear noticeably. Even if the positive electrode mixture can be supported on a positive electrode current collector, a positive electrode mixture layer in which the constituents are evenly distributed cannot be formed. Gelation may also occur when the positive electrode mixture is dried during the fabrication of positive electrodes, thus impairing the characteristics of the positive electrodes.

For lithium ion secondary batteries, there are cases where acids such as maleic acid and acetic acid are added to reduce the gelation of positive electrode mixtures. However, positive electrode active materials containing Ni and Mn for sodium ion secondary batteries are extremely highly basic; therefore, it would be difficult to sufficiently reduce gelation even if an acid as mentioned above is added to a positive electrode mixture in an amount similar to that for lithium ion secondary batteries. In particular, if positive electrodes are fabricated on a large scale, the positive electrode mixture cannot be applied to a positive electrode current collector because of noticeable gelation. In addition, if an acid is added in a sufficient amount to obtain a positive electrode mixture that can be applied to a positive electrode current collector, the resistance of the positive electrode would increase because of the increased amount of acid added.

Binders tend to deteriorate as they gel, which affects the long-term characteristics of batteries. If the constituents of a positive electrode are unevenly distributed due to the gelation of the binder, the resistance would increase at the interface between the positive electrode and the electrolyte during the absorption and release of sodium ions, and the conductivity of the positive electrode would also decrease. This would result in a decrease in initial discharge capacity. Furthermore, after repeated charge and discharge in this state, the positive electrode mixture would peel from the positive electrode current collector, and the positive electrode active material particles would also come off, thus leading to a decrease in capacity and a deterioration in cycle characteristics.

The positive electrode active material particles used in this embodiment are oxide particles that contain an oxide A containing Ni and Mn and that are covered by a covering layer containing a ceramic and/or a carbonaceous material (material B). Since the positive electrode active material particles have such a covering layer, the covering layer alleviates the basicity of the positive electrode active material particles. For example, the pH of an aqueous dispersion of 2 parts by mass of the positive electrode active material particles in 100 parts by mass of water can be reduced to 10 or less (preferably 9 or less).

Thus, the gelation of the positive electrode mixture can be reduced even though the oxide A has a significant tendency to cause the positive electrode mixture to gel. In particular, since the gelation of the positive electrode mixture can be reduced even if the positive electrode is fabricated on a large scale, the positive electrode can be stably manufactured. In addition, since the gelation of the positive electrode mixture can be reduced without adding an acid, an increase in the resistance of the positive electrode can be reduced. The progress of the gelation of the positive electrode mixture can also be reduced after the positive electrode mixture is supported on a positive electrode current collector and before the positive electrode is finished. Thus, a positive electrode in which the constituents are well (i.e., more evenly) dispersed is obtained. Not only is the deterioration of the binder reduced, but also the formation of smaller positive electrode active material particles is reduced by the covering layer. Thus, a decrease in the initial discharge capacity and a deterioration in the cycle characteristics of the sodium ion secondary battery can also be reduced.

The material B is present in an amount of, for example, from 1 to 10 parts by mass, preferably from 3 to 7 parts by mass, even more preferably from 3 to 5 parts by mass, per 100 parts by mass of the oxide particles. If the material B is present in an amount within such a range, the covering layer is more effective in alleviating the basicity of the positive electrode active material particles, thus further reducing the gelation of the positive electrode mixture. Accordingly, an increase in the resistance of the positive electrode is further reduced, and a deterioration in the cycle characteristics of the sodium ion secondary battery is further reduced.

The binder is present in an amount of, for example, from 0.5 to 5 parts by mass, preferably from 1 to 3 parts by mass, per 100 parts by mass of the positive electrode active material particles. If the binder is present in an amount within such a range, the gelation of the positive electrode mixture can be effectively reduced while the positive electrode active material particles are bound together.

The oxide A is preferably a sodium-containing transition metal oxide represented by formula (1): $Na_xMeO_2$ (where the elements Me are transition metal elements including at least Ni, Mn, and Ti, and x is the ratio of Na to the elements Me and is from $\frac{2}{3}$ to 1 in a fully discharged state). The stoichiometric ratio of Ni to Mn to Ti in the metal oxide is, for example, 5:3:2. To facilitate control of the crystal structure, it is preferred that, in the oxide A, x be from 0.9 to 1 in a fully discharged state, the ratio of Ni to the elements Me be 0.45 or more, and the ratio of Ti to the elements Me be 0.15 or more.

Metal oxides as mentioned above are highly basic and therefore have a significant tendency to cause positive electrode mixtures to gel.

In this embodiment, even if the oxide particles contain such a metal oxide, the presence of the covering layer alleviates the basicity of the positive electrode active material particles, thus reducing the gelation of the positive electrode mixture. In addition, the use of a metal oxide as mentioned above in the positive electrode provides a sodium ion secondary battery with a higher capacity.

A preferred example of a ceramic for use as the material B is at least one material selected from the group consisting of zirconia and alumina. If these ceramics are used in the covering layer, the covering layer is more effective in alleviating the basicity of the positive electrode active material particles, thus further reducing the gelation of the positive electrode mixture. Accordingly, an increase in the resistance of the positive electrode is further reduced, and a deterioration in the cycle characteristics of the sodium ion secondary battery is further reduced.

DETAILS OF EMBODIMENTS OF INVENTION

Specific examples of positive electrode active material particles for sodium ion secondary batteries and of sodium ion secondary batteries according to embodiments of the present invention will hereinafter be described with reference to the drawings where necessary. These examples, however, should not be construed as limiting the invention; rather, the invention is indicated by the appended claims, and all changes that come within the meaning and range of equivalency of the claims are intended to be embraced therein.

Positive Electrode Active Material Particles for Sodium Ion Secondary Battery

Each positive electrode active material particle includes an oxide particle that absorbs and releases sodium ions and a covering layer covering the oxide particle.

The oxide particle contains an oxide A containing Ni and Mn. It is preferred that at least the oxide A in the oxide particle absorb and release sodium ions. The oxide A is preferably, but not limited to, an oxide having a layered structure into and from which sodium is intercalated and deintercalated. To provide a sodium ion secondary battery with a higher capacity, the oxide particle preferably contains as much oxide A as possible, and the oxide A preferably accounts for 90% by mass or more of the oxide particle.

The oxide A may be a sodium-containing transition metal oxide represented by formula (1): $Na_xMeO_2$ (where Me is transition metal elements, and x is the ratio of Na to the elements Me). The value x varies with charge and discharge. In a fully discharged state, x is typically 1 or 2/3, although the value may vary to some extent. Examples of sodium-containing transition metal oxides represented by formula (1) include those represented by formula (1a): $Na_{x-\alpha}Me_{1+\alpha}O_2$ (where $\alpha$ satisfies $-0.03 \le \alpha \le 0.03$).

As the elements Me, the oxide A contain at least Ni and Mn, preferably at least Ni, Mn, and Ti. In addition to these elements, the elements Me may include, for example, Cr, Fe, and/or Co. An oxide A containing such elements tends to be highly basic; however, according to this embodiment, the basicity of the positive electrode active material particles can be effectively alleviated.

The positive electrode active material particles used in the positive electrode may contain a single oxide A or may contain two or more oxides A having different compositions.

In a preferred embodiment, the oxide A includes a multilayer structure of $MeO_2$ layers having an oxygen array. In a P2-type crystal structure, sodium occupies triangular prismatic sites between the $MeO_2$ layers. In an O3-type crystal structure, sodium occupies six-coordinated octahedral sites between the $MeO_2$ layers. Having such a multilayer structure, the oxide A can reversibly absorb and release sodium ions. Specifically, sodium ions are absorbed between the $MeO_2$ layers during discharge and are released from between the $MeO_2$ layers during charge. If the oxide A has a layered O3-type crystal structure, the positive electrode mixture tends to gel noticeably since a layered O3-type crystal structure is more soluble in a solvent than a layered P2-type crystal structure. According to this embodiment, the gelation of the positive electrode mixture can be effectively reduced even if the oxide A has a layered O3-type crystal structure.

In the sodium-containing transition metal oxide, x in formula (1) is, for example, $0.97x_q \le x \le 1.03x_q$, or may be $0.98x_q \le x \le 1.02x_q$, where $x_q$ is the stoichiometric ratio of Na to the elements Me in a fully discharged state. A sodium-containing transition metal oxide having such a value of x in a fully discharged state can stably reversibly absorb and release sodium ions.

The stoichiometric ratio of Na to the elements Me in the sodium-containing transition metal oxide represented by formula (1) (or formula (1a)), $x_q$, is determined depending on the type of crystal structure. If the sodium-containing transition metal oxide has a layered P2-type crystal structure, $x_q$ is 2/3 in a fully discharged state. If the sodium-containing transition metal oxide has a layered O3-type crystal structure, $x_q$ is 1 in a fully discharged state.

It is desirable that Ni and Mn (or Ni, Mn, and Ti) constitute 80 atomic percent or more (e.g., from 80 to 100 atomic percent) of the elements Me in the sodium-containing transition metal oxide represented by formula (1) (and formula (1a)).

The elements Me preferably include a combination of Ni, Mn, and Ti. If the elements Me are such a combination, the sodium-containing transition metal oxide preferably has a layered O3-type crystal structure. Here, $x_q$ may vary to some extent. For example, $x_q$ may be from 0.9 to 1 in a fully discharged state. In a layered O3-type sodium-containing transition metal oxide, $x_q$ is preferably from 0.9 to 1 in a fully discharged state, the ratio of Ni to the elements Me is preferably 0.45 or more, and the ratio of Ti to the elements Me is preferably 0.15 or more.

In a layered O3-type sodium-containing transition metal oxide, the stoichiometric ratio of Ni to Mn to Ti may vary to some extent. Specifically, if the stoichiometric ratio is 100 atomic percent, the proportion of each of Ni, Mn, and Ti may be, for example, from 90 to 110 atomic percent, or from 95 to 105 atomic percent. In addition, it is desirable that the sum of the proportions of Ni, Mn, and Ti be 1.

The covering layer covering the oxide particles in the positive electrode active material particles contains at least one material B selected from the group consisting of a ceramic and a carbonaceous material. The formation of the covering layer will improve the stability of the positive electrode active material particles and reduce the dissolution of a basic substance. In this embodiment, even though the covering layer containing the material B covers the surface of the oxide particles, an increase in the resistance of the positive electrode is reduced, and the sodium ion secondary battery can also be charged and discharged. Hence, it is believed that the oxide particles in the positive electrode active material particles are exposed, without being covered, to such an extent that the resistance of the positive electrode and the charge/discharge characteristics are not affected. Nevertheless, according to this embodiment, the basicity of the positive electrode active material particles is unexpectedly alleviated. Thus, gelation will be reduced to an acceptable level during the manufacture of the positive electrode.

The ceramic may be, for example, at least one material selected from the group consisting of zirconia, alumina, silicon nitride, and silicon carbide. It is preferred to use zirconia and/or alumina since they tend to be more effective in reducing the gelation of the positive electrode mixture for some reason. In particular, the use of zirconia is even more effective in reducing an increase in the resistance of the positive electrode and a deterioration in cycle characteristics.

The carbonaceous material may be, for example, at least one material selected from the group consisting of carbon black, graphite, carbon fibers (e.g., vapor-grown carbon fibers), and carbon nanotubes. If a carbonaceous material is used in the covering layer, it is easier to reduce an increase in the resistance of the positive electrode.

Although covering may be performed by spreading material B particles having smaller sizes than the oxide particles over the surface of the oxide particles, other techniques such as mechanochemical treatment (including mechanofusion treatment) are preferred. Known techniques can be employed for covering with the material B.

The positive electrode active material particles have an average particle size $D_{50}$ of, for example, from 5 to 15 μm, preferably from 7 to 12 μm. If the positive electrode active material particles have an average particle size within such a range, it is easier to achieve the effect of reducing the gelation of the positive electrode mixture, and it is easier to reduce a deterioration of the positive electrode active material particles after repeated charge/discharge cycles.

Here, the average particle size $D_{50}$ refers to the particle size at which the cumulative volume is 50% (i.e., the median size) in a volume-based particle size distribution obtained using an instrument such as a laser diffraction particle size distribution analyzer.

The specific surface area of the positive electrode active material particles as measured by the BET technique is, for example, but not limited to, from 0.3 to 1.0 $m^2/g$. If the specific surface area falls within such a range, it is easier to provide a sodium ion secondary battery with a higher capacity, and it is also easier to further reduce the gelation of the positive electrode mixture.

Sodium Ion Secondary Battery
Positive Electrode

In addition to the positive electrode active material particles described above, the positive electrode contains a conductive additive and a binder. The constituents other than the positive electrode active material particles will hereinafter be described.

The binder used in the positive electrode contains a fluorocarbon resin. Examples of fluorocarbon resins include fluorine-containing polymers containing fluorine-containing monomer units such as tetrafluoroethylene-derived monomer units, hexafluoropropylene-derived monomer units, vinylidene-fluoride-derived monomer units (vinylidene fluoride units), and vinyl-fluoride-derived monomer units (vinyl fluoride units). The fluorocarbon resin may contain one type of fluorine-containing monomer unit or may contain two or more types of fluorine-containing monomer units. The fluorocarbon resin may also be a copolymer containing comonomer units other than fluorine-containing monomer units.

In particular, fluorocarbon resins containing vinylidene fluoride units or vinyl fluoride units tend to undergo a hydrofluoric acid removal reaction in a basic atmosphere and thus tend to gel (including crosslinking) by forming a polyene structure. Even if such a fluorocarbon resin is used in this embodiment, gelation can be reduced since the positive electrode active material particles have a covering layer that alleviates the basicity thereof.

Preferred examples of fluorocarbon resins include polyvinylidene fluoride (PVDF); polyvinyl fluoride; copolymers containing vinylidene fluoride units and vinyl fluoride units; copolymers containing vinylidene fluoride units and/or vinyl fluoride units, other fluorine-containing monomer units (e.g., tetrafluoroethylene units and/or hexafluoropropylene units), and optionally other comonomer units; and copolymers containing vinylidene fluoride units and/or vinyl fluoride units and other comonomer units.

Examples of comonomers include halogen-containing monomers and halogen-free comonomers. Examples of halogen-containing monomers include chlorine-containing monomers such as vinyl chloride. Examples of halogen-free comonomers include olefins such as ethylene and propylene; acrylic monomers such as acrylic acid, methacrylic acid, and esters and salts thereof; and vinyl monomers such as acrylonitrile, vinyl acetate, and styrene. The fluorocarbon resin may contain one type of comonomer-derived unit or may contain two or more types of comonomer-derived units.

In this embodiment, gelation can be effectively reduced even if the fluorocarbon resin contains vinylidene fluoride or vinyl fluoride blocks, which tend to form a polyene structure. Examples of such fluorocarbon resins include PVDF, vinylidene fluoride block copolymers, polyvinyl fluoride, and vinyl fluoride block copolymers. As comonomers that form block copolymers, fluorine-containing monomers other than vinylidene fluoride and vinyl fluoride and other comonomers as given as examples above can be used.

The content of fluorine-containing monomer units in the fluorocarbon resin is, for example, 30 mol % or more, preferably 50 mol % or more or 70 mol % or more. The content of fluorine-containing monomer units in the fluorocarbon resin is 100 mol % or less. The sum of the contents of vinylidene fluoride units and vinyl fluoride units in the fluorocarbon resin may fall within such a range. In this case, gelation would generally tend to occur because of the high content of vinylidene fluoride units and/or vinyl fluoride units; however, in this embodiment, gelation can be effectively reduced even if such a fluorocarbon resin is used.

The binder may contain a polymer (second polymer) other than the fluorocarbon resin (first polymer). The content of the fluorocarbon resin in the binder is, for example, from 80% to 100% by mass.

A suitable second polymer may be selected from known binders used in positive electrodes of sodium ion secondary batteries, including polyolefin resins, rubbery polymers such as styrene-butadiene rubber, polyamide resins, polyimide resins such as polyamide-imides, polyvinyl pyrrolidone, polyvinyl alcohol, and/or cellulose ethers (e.g., carboxymethylcellulose and salts thereof).

Examples of conductive additives include, but not limited to, those given as examples of carbonaceous materials that form the covering layer. The conductive additive is used by mixing it in the positive electrode mixture together with the positive electrode active material particles and the binder.

Thus, the conductive additive is typically dispersed in the positive electrode together with other materials such as the binder.

A suitable amount of conductive additive may be selected from, for example, the range from 1 to 15 parts by mass, or from 1 to 10 parts by mass, per 100 parts by mass of the positive electrode active material particles so that it is easier to provide a positive electrode with sufficient conductivity.

The positive electrode can be formed by supporting a positive electrode mixture containing the positive electrode active material particles, the conductive additive, and the binder on a positive electrode current collector, compressing the positive electrode mixture in the thickness direction of the positive electrode current collector, and drying the positive electrode mixture. The positive electrode mixture is typically used in slurry form. A positive electrode mixture slurry is prepared by dispersing the constituents of the positive electrode mixture in a dispersion medium.

The dispersion medium used is preferably, for example, an organic solvent such as N-methyl-2-pyrrolidone (NMP). An organic solvent may optionally be used as a mixture with water.

Known additives may optionally be added to the positive electrode mixture. Also, organic acids and inorganic acids may optionally be added to the positive electrode mixture to reduce the gelation of the positive electrode mixture.

The positive electrode current collector may be a metal foil or a porous metal (e.g., a nonwoven fabric of metal fibers and/or a porous metal sheet). Porous metals having a three-dimensional network backbone (particularly, a hollow backbone) may also be used as porous metals. The material for the positive electrode current collector is preferably, but not limited to, a material such as aluminum and/or an aluminum alloy from the viewpoint of stability at the positive electrode potential. Metal foils have a thickness of, for example, from 10 to 50 μm. Porous metals have a thickness of, for example, from 100 to 2,000 μm.

If the positive electrode current collector is a metal foil, the positive electrode mixture slurry is applied to a surface of the metal foil. If the positive electrode current collector is a porous metal, the positive electrode mixture slurry may be applied onto a surface of the porous metal or may be charged into the porous metal. Since the gelation of the positive electrode mixture slurry is reduced, the positive electrode mixture slurry can be easily applied onto or charged into the positive electrode current collector to form a uniform coating. Compression may be performed, for example, by feeding a positive electrode current collector having the positive electrode mixture supported thereon between a pair of rollers to roll the positive electrode current collector between the rollers. Optionally, drying may be performed after the positive electrode mixture is supported on the positive electrode current collector and before compression.

Negative Electrode

The negative electrode includes a negative electrode active material. The negative electrode may include a negative electrode current collector and a negative electrode active material (or negative electrode mixture) supported on the negative electrode current collector.

The negative electrode current collector may be a metal foil or a porous metal as mentioned for the positive electrode current collector. A suitable thickness of the negative electrode current collector may be selected from the range mentioned for the positive electrode current collector.

The material for the negative electrode current collector is preferably, but not limited to, a material such as aluminum, an aluminum alloy, copper, a copper alloy, nickel, a nickel alloy, and/or stainless steel since these materials do not alloy with sodium and are stable at the negative electrode potential.

The negative electrode active material may be, for example, a material that reversibly absorbs and releases sodium ions or a material that alloys with sodium.

Examples of such negative electrode active materials include metals such as sodium, titanium, zinc, indium, tin, and silicon and alloys and compounds thereof; and carbonaceous materials. In addition to these metals, alloys may further contain other alkali metals and/or alkaline earth metals.

Examples of metal compounds include lithium-containing titanium oxides such as lithium titanate (e.g., $Li_2Ti_3O_7$ and/or $Li_4Ti_5O_{12}$) and sodium-containing titanium oxides such as sodium titanate (e.g., $Na_2Ti_3O_7$ and/or $Na_4Ti_5O_{12}$). Lithium-containing titanium oxides (or sodium-containing titanium oxides) may have some titanium and/or some lithium (or sodium) replaced with other elements.

Examples of carbonaceous materials include soft carbon and/or hard carbon.

These negative electrode active materials may be used alone or in a combination of two or more thereof.

Preferred of these materials are, for example, the foregoing compounds (e.g., sodium-containing titanium oxides) and/or carbonaceous materials (e.g., hard carbon).

For example, as in the case of the positive electrode, the negative electrode can be formed by applying or charging a negative electrode mixture containing the negative electrode active material onto or into a negative electrode current collector and optionally compressing (or rolling) the negative electrode mixture in the thickness direction. Drying may be performed in any suitable stage. An electrode obtained by forming a deposited film of negative electrode active material by a vapor-phase process such as evaporation or sputtering on a surface of a negative electrode current collector may also be used as the negative electrode. Alternatively, a sheet of metal or alloy may be directly used as the negative electrode or may be bonded with pressure to a current collector and used as the negative electrode. The negative electrode active material may optionally be predoped with sodium ions.

In addition to the negative electrode active material, the negative electrode mixture may further contain a conductive additive and/or a binder.

A suitable conductive additive may be selected from the carbonaceous materials given as examples for the covering layer of the positive electrode. A suitable amount of conductive additive based on the amount of negative electrode active material may also be selected from the range given as an example range of amounts of conductive additive based on the amount of positive electrode active material particles.

Examples of dispersion media include organic solvents, such as NMP, and/or water.

The binder may be any type of binder. For example, a suitable polymer may be selected from fluorocarbon resins such as PVDF and polytetrafluoroethylene and the second polymers given as examples of binders for the positive electrode.

These binders may be used alone or in a combination of two or more thereof.

The amount of binder may be selected from, for example, but not limited to, the range from 0.5 to 15 parts by mass, or from 1 to 12 parts by mass, per 100 parts by mass of the negative electrode active material so that it is easier to achieve high binding strength and capacity.

Separator

The separator disposed between the positive and negative electrodes may be, for example, a resin microporous film and/or nonwoven fabric. The material for the separator may be selected by taking into account the service temperature of the battery. Examples of resins present in the fibers forming the microporous film or nonwoven fabric include polyolefin resins, polyphenylene sulfide resins, polyamide resins, and/or polyimide resins. The fibers forming the nonwoven fabric may be inorganic fibers such as glass fibers. The separator may contain an inorganic filler such as ceramic particles. The inorganic filler may be present as a coating on the separator.

The thickness of the separator may be selected from, for example, but not limited to, the range from 10 to 300 µm.

Electrolyte

A nonaqueous electrolyte containing sodium ions is used as the electrolyte. The nonaqueous electrolyte used may be, for example, an electrolyte (organic electrolyte) prepared by dissolving a salt of sodium ions with anions (sodium salt) in a nonaqueous solvent (organic solvent) or an ionic liquid (molten salt electrolyte) containing sodium ions and anions.

A suitable concentration of the sodium salt or sodium ions in the electrolyte may be selected from, for example, the range from 0.3 to 10 mol/L.

Organic Electrolyte

In addition to the nonaqueous solvent (organic solvent) and the sodium salt, the organic electrolyte may contain other materials such as ionic liquids and/or additives. The sum of the contents of the nonaqueous solvent and the sodium salt in the electrolyte may be, for example, from 60% to 100% by mass so that it is easier to achieve good low-temperature characteristics.

The anions (first anions) forming the sodium salt may be any type of anion. Examples of anions include hexafluorophosphate ions, tetrafluoroborate ions, perchlorate ions, bis(oxalato)borate ions $(B(C_2O_4)_2^-)$, tris(oxalato)phosphate ions $(P(C_2O_4)_3^-)$, trifluoromethanesulfonate ions $(CF_3SO_3^-)$, and bissulfonylamide anions. These sodium salts may be used alone or in a combination of two or more sodium salts containing different first anions.

Examples of bissulfonylamide anions above include bis(fluorosulfonyl)amide anions (FSA), bis(trifluoromethylsulfonyl)amide anions (TFSA), (fluorosulfonyl)(perfluoroalkylsulfonyl)amide anions (e.g., $(FSO_2)(CF_3SO_2)N^-$), and bis(perfluoroalkylsulfonyl)amide anions (e.g., $N(SO_2CF_3)_2^-$ and $N(SO_2C_2F_5)_2^-$).

The nonaqueous solvent may be any nonaqueous solvent, including known nonaqueous solvents for use in sodium ion secondary batteries. From the viewpoint of ionic conductivity, cyclic carbonates such as ethylene carbonate, propylene carbonate, and butylene carbonate; linear carbonates such as dimethyl carbonate, diethyl carbonate, and ethyl methyl carbonate; and cyclic carbonate esters such as γ-butyrolactone are preferably used as the nonaqueous solvent. These nonaqueous solvents may be used alone or in a combination of two or more thereof.

Molten Salt Electrolyte

If an ionic liquid is used as the electrolyte, the electrolyte may contain other materials such as nonaqueous solvents and/or additives in addition to the ionic liquid, which contains cations and anions. However, the content of the ionic liquid in the electrolyte may be from 70% to 100% by mass so that it is easier to reduce the decomposition of the electrolyte.

In addition to sodium ions (second cations), the ionic liquid may contain cations (third cations) other than sodium ions. Examples of third cations include organic cations and inorganic cations other than sodium ions. The ionic liquid may contain one type of third cation or may contain a combination of two or more types of third cations.

Examples of inorganic cations include alkali metal ions (e.g., potassium ions) other than sodium ions and/or alkaline earth metal ions (e.g., magnesium ions and calcium ions) and ammonium ions.

Examples of organic cations include cations derived from aliphatic amines, alicyclic amines, and aromatic amines (e.g., quaternary ammonium cations), nitrogen-containing onium cations such as nitrogen-containing heterocyclic cations (i.e., cations derived from cyclic amines), sulfur-containing onium cations, and phosphorus-containing onium cations.

Particularly preferred of these organic cations are quaternary ammonium cations and cations having a pyrrolidone, pyridine, or imidazole backbone as a nitrogen-containing heterocyclic backbone.

Specific examples of organic cations include tetraalkylammonium cations such as tetraethylammonium cations and methyltriethylammonium cations, 1-methyl-1-propylpyrrolidinium cations (Py13), 1-butyl-1-methylpyrrolidinium cations, 1-ethyl-3-methylimidazolium cations, and 1-butyl-3-methylimidazolium cations.

Bissulfonylamide anions are preferably used as the anions. Suitable bissulfonylamide anions may be selected from those given as examples for the organic electrolyte.

Particularly preferred bissulfonylamide anions are FSA and/or TFSA.

The sodium ion secondary battery can be manufactured, for example, by the steps of (a) forming an electrode assembly including a positive electrode, a negative electrode, and a separator disposed between the positive and negative electrodes and (b) placing the electrode assembly and an electrolyte in a battery case.

Figure 1:
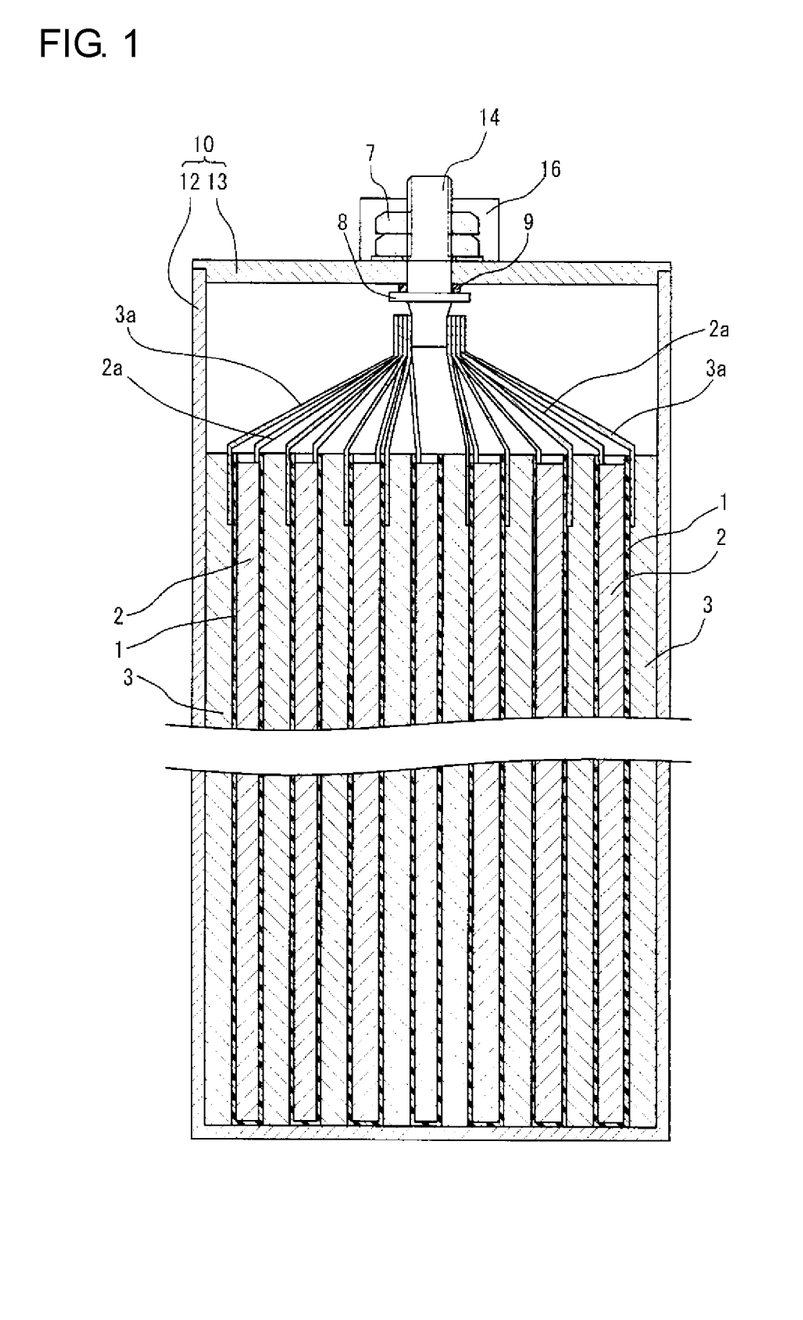
FIG. 1 is a longitudinal sectional view schematically showing a sodium ion secondary battery according to an embodiment of the present invention.

FIG. 1 is a longitudinal sectional view schematically showing a sodium ion secondary battery according to an embodiment of the present invention. The sodium ion secondary battery includes a stacked electrode assembly, an electrolyte (not shown), and a prismatic aluminum battery case 10 containing these components. The battery case 10 is composed of an open-top, closed-bottom container body 12 and a lid 13 closing the top opening thereof.

A safety valve 16 for releasing gas generated inside the battery case 10 in response to an increase in internal pressure is disposed in the center of the lid 13. With the safety valve 16 located in the center, an external positive terminal extending through the lid 13 is disposed near one side of the lid 13, whereas an external negative terminal 14 extending through the lid 13 is disposed at a position near the other side of the lid 13.

The stacked electrode assembly is composed of a plurality of positive electrode 2, a plurality of negative electrodes 3, and a plurality of separators 1 disposed therebetween, all of which have a rectangular sheet shape. Although the separators 1 in FIG. 1 are formed so as to have a bag shape surrounding any positive electrode 2, any form of separator may be used. The plurality of positive electrodes 2 and the plurality of negative electrodes 3 are alternately arranged in the stacking direction within the electrode assembly.

A positive lead tab 2a may be formed at one end of each positive electrode 2. The positive lead tabs 2a of the plurality of positive electrodes 2 are bundled together and are connected to the external positive terminal disposed on the lid 13 of the battery case 10 such that the plurality of positive electrode 2 are connected in parallel. Similarly, a negative lead tab 3a may be formed at one end of each negative electrode 3. The negative lead tabs 3a of the plurality of negative electrodes 3 are bundled together and are connected to the external negative terminal 14 disposed on the lid 13 of the battery case 10 such that the plurality of negative electrode 3 are connected in parallel. It is desirable that the bundles of the positive lead tabs 2a and the negative lead tabs 3a be arranged at a distance from each other on the left and right sides of one end surface of the electrode assembly so as not to be in contact with each other.

The external positive terminal and the external negative terminal 14 are each pillar-shaped and have a screw thread at least in the portion exposed to the outside. A nut 7 is fitted into the screw thread of each terminal. As the nut 7 is rotated, the nut 7 is secured to the lid 13. A flange 8 is disposed on the portion of each terminal contained inside the battery case 10. As the nut 7 is rotated, the flange 8 is secured to the inner surface of the lid 13 with an O-ring-shaped gasket 9 therebetween.

The electrode assembly is not limited to the stacked type, but may be an electrode assembly formed by winding positive and negative electrodes with a separator therebetween. To prevent the precipitation of metallic sodium on the negative electrodes, the negative electrodes may have a larger size than the positive electrodes.

EXAMPLES

The present invention will now be specifically described based on the following examples and comparative example, although the following examples should not be construed as limiting the invention.

Example 1

(1) Preparation of Positive Electrode Active Material Particles $NaTi_{0.2}Ni_{0.5}Mn_{0.3}O_2$ particles (oxide particles, average particle size $D_{50}$: 9 μm) were subjected to mechanical alloying together with zirconia (material B, average particle size $D_{50}$: 100 nm) to form a zirconia covering layer on the surface of the oxide particles. The mass ratio of the oxide particles to the material B was 100:7. The resulting particles (positive electrode active material particles) had an average particle size $D_{50}$ of 9 μm and a BET specific surface area of 0.5 m$^2$/g.

(2) Fabrication of Positive Electrode

The positive electrode active material particles obtained in (1) above, furnace black (conductive additive), and PVDF (binder) were mixed with NMP (dispersion medium) to prepare a positive electrode mixture paste. Here, the mass ratio of the positive electrode active material particles to the conductive additive to the binder was 95:3:2. The positive electrode mixture paste was applied to one side of an aluminum foil with a thickness of 20 μm and was dried and compressed to fabricate a positive electrode with a thickness of 80 μm. The positive electrode was punched into a coin shape with a diameter of 12 mm and was further dried.

(3) Assembly of Sodium Ion Secondary Battery

A metallic sodium disc (manufactured by Aldrich, thickness: 200 μm) was bonded with pressure to an aluminum current collector to fabricate a negative electrode with a total thickness of 220 μm. The negative electrode was punched into a coin shape with a diameter of 12 mm.

The coin-shaped negative electrode and a separator were sufficiently dried. The coin-shaped negative electrode was then placed in a shallow cylindrical Al/SUS clad container, and the coin-shaped positive electrode was placed thereon with the coin-shaped separator therebetween. A predetermined amount of electrolyte was poured into the container. The opening of the container was then sealed with a shallow cylindrical Al/SUS clad seal plate having an insulating gasket around the periphery thereof. In this way, pressure was applied to the electrode assembly composed of the negative electrode, the separator, and the positive electrode between the bottom surface of the container and the seal plate to ensure contact between the members. Thus, a coin-shaped sodium ion secondary battery with a design capacity of 1.5 mAh was fabricated.

The separator used was a silica-coated polyolefin nonwoven fabric (manufactured by Nippon Sheet Glass Co. Ltd., NPS, thickness: 50 μm). The electrolyte used was an ionic liquid containing Na.FSA and Py13.FSA in a molar ratio of 40:60 (content of ionic liquid in electrolyte: 100% by mass).

Example 2

Positive electrode active material particles were prepared in the same manner as in Example 1 except that the mass ratio of the oxide particles to the material B was changed to 100:5 in (1) of Example 1. The positive electrode active material particles had an average particle size $D_{50}$ of 9 μm. A positive electrode mixture paste was prepared in the same manner as in Example 1 except that the resulting positive electrode active material particles were used, and a battery was fabricated and evaluated.

Example 3

Positive electrode active material particles were prepared in the same manner as in Example 1 except that the mass ratio of the oxide particles to the material B was changed to 100:3 in (1) of Example 1. The positive electrode active material particles had an average particle size $D_{50}$ of 9 μm. A positive electrode mixture paste was prepared in the same manner as in Example 1 except that the resulting positive electrode active material particles were used, and a battery was fabricated and evaluated.

Comparative Example 1

A positive electrode mixture paste was prepared in the same manner as in Example 1 except that the same oxide particles as used in (1) of Example 1 were used without a zirconia covering layer as positive electrode active material particles, and a battery was fabricated and evaluated.

Evaluation (a) Gelation of Positive Electrode Mixture

Positive electrode mixture pastes were prepared by the same procedures as in the Examples and the Comparative Example and were tested for the degree of gelation by stirring with a spatula. The positive electrode mixture pastes of Examples 1 to 3 did not gel one day after preparation, whereas the positive electrode mixture paste of Comparative Example 1 gelled ten minutes after preparation and was not usable for application.

(b) pH of Aqueous Dispersion of Positive Electrode Active Material Particles

The pH of aqueous dispersions of 2 parts by mass of the positive electrode active material particles used in the Examples and the Comparative Example in 100 parts by mass of water was measured with a pH meter. As a result, the pH of these examples was as follows: 8.9 (Example 1), 9.0 (Example 2), 9.6 (Example 3), and 11.4 (Comparative Example 1).

(c) Cycle Characteristics

The sodium ion secondary batteries were heated to 60° C. and were charged and discharged for a predetermined number of cycles, each cycle involving conditions (i) and (ii). The discharge capacity in each cycle was determined. The percentage of the discharge capacity in each cycle (capacity retention) (%) was determined, with the discharge capacity in the first cycle being 100%. The plateau voltage during charge and the plateau voltage during discharge were determined from the charge/discharge curve for each cycle. IR drop (V) was calculated as the difference between the two plateau voltages, and it was examined how the IR drop changed. For Example 3 and Comparative Example 1, the change in voltage (V) with capacity (mAh/g) during discharge in the first cycle and during discharge in the 15th cycle was determined.

(i) Charged at a current of 0.1 C to an upper-limit voltage (charge cut-off voltage) of 4.4 V (ii) Discharged at a current of 0.1 C to a lower-limit voltage (discharge cut-off voltage) of 2.4 V The sodium ion secondary batteries of Example 3 and Comparative Example 1 were also charged and discharged for a predetermined number of cycles, each cycle involving conditions (iii) and (iv) below. The change in voltage (V) with capacity (mAh/g) during discharge in the first cycle and during discharge in the 40th cycle was determined.

Figure 2:
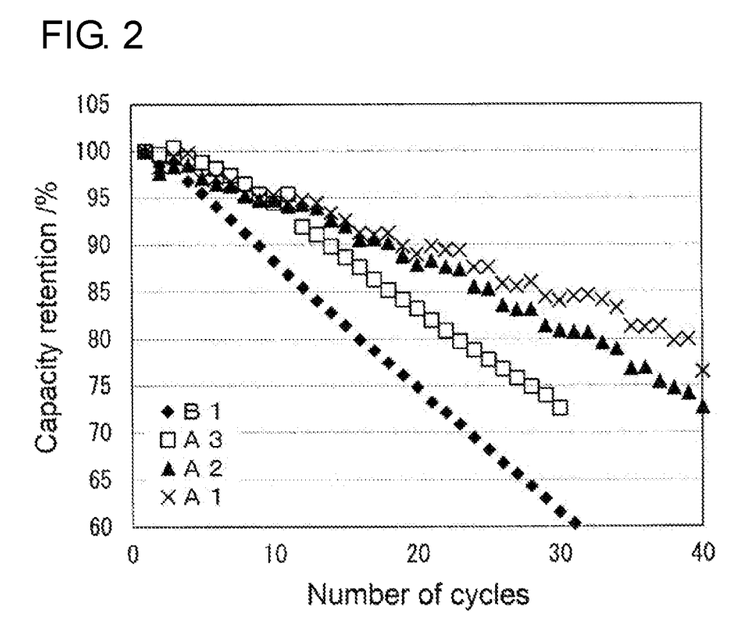
FIG. 2 is a graph showing how the capacity retention changed with the number of charge-discharge cycles for Examples 1 to 3 and Comparative Example 1.
Figure 3:
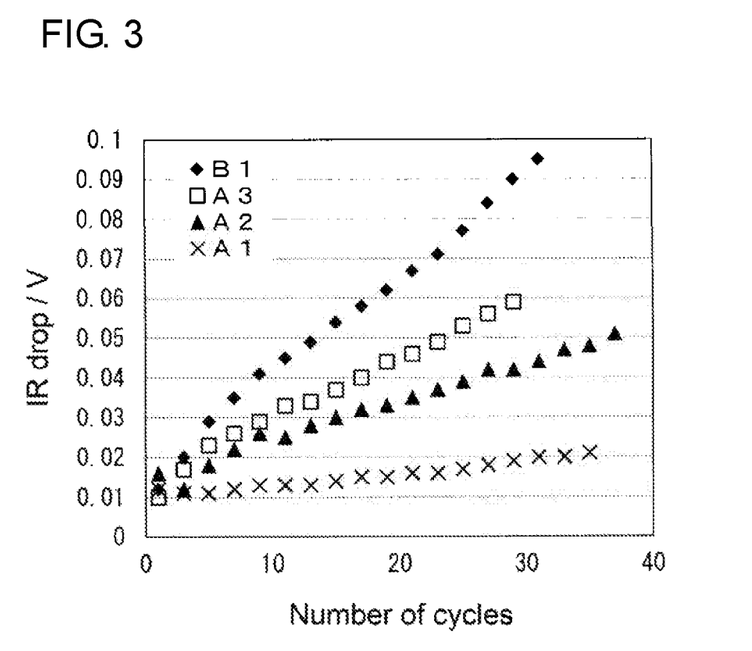
FIG. 3 is a graph showing how the IR drop changed with the number of charge-discharge cycles for Examples 1 to 3 and Comparative Example 1.
Figure 4:
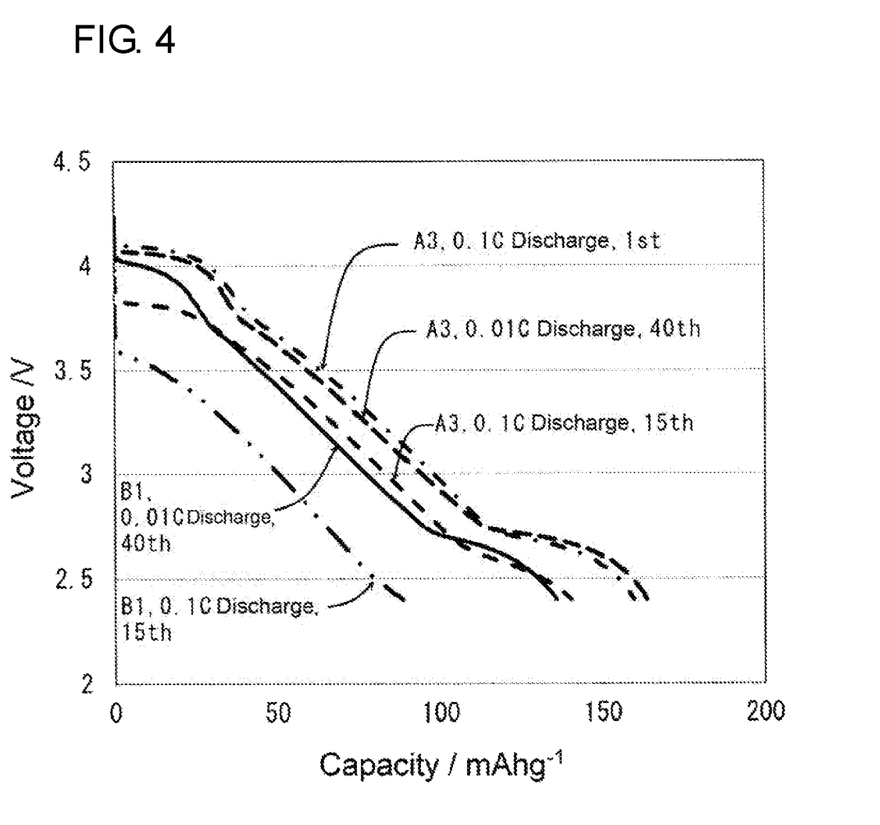
FIG. 4 is a graph showing the change in voltage with discharge capacity during discharge in the first cycle (discharged at 0.1 C), during discharge in the 15th cycle (discharged at 0.1 C), and during discharge in the 40th cycle (discharged at 0.01 C) for Example 3 and Comparative Example 1.

(iii) Charged at a current of 0.01 C to an upper-limit voltage (charge cut-off voltage) of 4.4 V (iv) Discharged at a current of 0.01 C to a lower-limit voltage (discharge cut-off voltage) of 2.4 V The evaluation results are shown in FIGS. 2 to 4. FIG. 2 is a graph showing how the capacity retention changed with the number of charge-discharge cycles. FIG. 3 is a graph showing how the IR drop changed with the number of charge-discharge cycles. FIG. 4 is a graph showing the change in voltage with discharge capacity during discharge in the first cycle (discharged at 0.1 C), during discharge in the 15th cycle (discharged at 0.1 C), and during discharge in the 40th cycle (discharged at 0.01 C) for Example 3 and Comparative Example 1. Examples 1 to 3 were designated as A1 to A3, and Comparative Example 1 was designated as B1.

As shown in FIGS. 2 and 3, an increase in resistance and a deterioration in cycle characteristics were reduced in the Examples compared with the Comparative Example. In addition, as shown in FIG. 4, an increase in resistance was reduced in the Examples compared with the Comparative Example. At low discharge current, the capacity for discharge in the 40th cycle was comparable to the capacity for discharge in the first cycle.

REFERENCE SIGNS LIST

1: separator
2: positive electrode
2a: positive lead tab
3: negative electrode
3a: negative lead tab
7: nut
8: flange
9: gasket
10: battery case
12: container body
13: lid
14: external negative terminal
16: safety valve

The invention claimed is:

1. A sodium ion secondary battery comprising a positive electrode, a negative electrode, a separator disposed between the positive and negative electrodes, and a sodium-ion-conducting nonaqueous electrolyte,
   wherein the positive electrode comprises positive electrode active material particles, a conductive additive, and a binder,
   each positive electrode active material particle comprises an oxide particle that absorbs and releases sodium ions and a covering layer covering the oxide particle,
   the oxide particle comprises an oxide A containing Ni and Mn,
   the covering layer comprises at least one material B selected from the group consisting of a ceramic and a carbonaceous material,
   the binder comprises a fluorocarbon resin, and
   the material B is present in an amount of from 1 to 10 parts by mass per 100 parts by mass of the oxide particles.

2. The sodium ion secondary battery according to claim 1, wherein the binder is present in an amount of from 0.5 to 5 parts by mass per 100 parts by mass of the positive electrode active material particles.

3. The sodium ion secondary battery according to claim 1, wherein the oxide A is a sodium-containing transition metal oxide represented by formula (1): $Na_xMeO_2$, where elements Me are transition metal elements including at least Ni, Mn, and Ti, and x is a ratio of Na to the elements Me and is from ⅔ to 1 in a fully discharged state.

4. The sodium ion secondary battery according to claim 3, wherein x in the sodium-containing transition metal oxide is from 0.9 to 1 in a fully discharged state, a ratio of Ni to the elements Me is 0.45 or more, and a ratio of Ti to the elements Me is 0.15 or more.

5. The sodium ion secondary battery according to claim 1, wherein the ceramic is at least one material selected from the group consisting of zirconia and alumina.

6. Positive electrode active material particles for a sodium ion secondary battery, each positive electrode active material particle comprising an oxide particle that absorbs and releases sodium ions and a covering layer covering the oxide particle,
   wherein the oxide particle comprises an oxide A containing Ni and Mn,
   the covering layer comprises at least one material B selected from the group consisting of a ceramic and a carbonaceous material, and
   the oxide A is a sodium-containing transition metal oxide represented by formula (1): $Na_xMeO_2$, where elements Me are transition metal elements including at least Ni, Mn, and Ti, and x is a ratio of Na to the elements Me and is from ⅔ to 1 in a fully discharged state.

7. The positive electrode active material particles for a sodium ion secondary battery according to claim 6, wherein an aqueous dispersion of 2 parts by mass of the positive electrode active material particles in 100 parts by mass of water has a pH of 10 or less.

8. A sodium ion secondary battery comprising a positive electrode, a negative electrode, a separator disposed between the positive and negative electrodes, and a sodium-ion-conducting nonaqueous electrolyte,
   wherein the positive electrode comprises positive electrode active material particles, a conductive additive, and a binder, each positive electrode active material particle comprises an oxide particle that absorbs and releases sodium ions and a covering layer covering the oxide particle, the oxide particle comprises an oxide A containing Ni and Mn, the covering layer comprises at least one material B selected from the group consisting of a ceramic and a carbonaceous material, the binder comprises a fluorocarbon resin, and the oxide A is a sodium-containing transition metal oxide represented by formula (1): $Na_xMeO_2$, where elements Me are transition metal elements including at least Ni, Mn, and Ti, and x is a ratio of Na to the elements Me and is from $2/3$ to 1 in a fully discharged state.

9. The sodium ion secondary battery according to claim 8, wherein x in the sodium-containing transition metal oxide is from 0.9 to 1 in a fully discharged state, a ratio of Ni to the elements Me is 0.45 or more, and a ratio of Ti to the elements Me is 0.15 or more.

10. A sodium ion secondary battery comprising a positive electrode, a negative electrode, a separator disposed between the positive and negative electrodes, and a sodium-ion-conducting nonaqueous electrolyte, wherein the positive electrode comprises positive electrode active material particles, a conductive additive, and a binder, each positive electrode active material particle comprises an oxide particle that absorbs and releases sodium ions and a covering layer covering the oxide particle, the oxide particle comprises an oxide A containing Ni and Mn, the covering layer comprises at least one material B selected from the group consisting of a ceramic and a carbonaceous material, the binder comprises a fluorocarbon resin, and the ceramic is at least one material selected from the group consisting of zirconia and alumina.

* * * * *